United States Patent [19]

Bramhall

[11] 4,323,533

[45] Apr. 6, 1982

[54] ROTARY FORMING OF ARTICLES

[75] Inventor: George H. Bramhall, Boulder, Colo.

[73] Assignee: Monsanto Company, St. Louis, Mo.

[21] Appl. No.: 219,141

[22] Filed: Dec. 22, 1980

Related U.S. Application Data

[63] Continuation of Ser. No. 67,463, Aug. 17, 1979, abandoned.

[51] Int. Cl.³ .............................................. B28B 11/16
[52] U.S. Cl. .................................... 264/145; 264/148;
264/160; 264/167; 264/175; 264/235; 264/237;
264/280; 264/327
[58] Field of Search .............. 264/145, 148, 160, 167,
264/175, 235, 237, 284, 327; 425/327

[56] References Cited

U.S. PATENT DOCUMENTS

| | | | |
|---|---|---|---|
| 3,107,394 | 10/1963 | Varon | 425/327 |
| 3,241,182 | 3/1966 | Kessler | 425/325 |
| 3,256,376 | 6/1966 | Leedy et al. | 264/284 |
| 3,478,138 | 11/1969 | Friesner | 264/145 |
| 3,507,010 | 4/1970 | Doleman et al. | 425/134 |
| 3,555,601 | 1/1971 | Price | 425/327 |
| 3,768,946 | 10/1973 | Matuschke | 425/363 |
| 3,798,294 | 3/1974 | Hollenbeck | 264/175 |
| 3,859,407 | 1/1975 | Blanding et al. | 264/284 |
| 3,917,772 | 11/1975 | Hollenbeck | 264/284 |
| 4,097,634 | 6/1978 | Bergh | 428/156 |

FOREIGN PATENT DOCUMENTS

1246923  10/1960  France .

OTHER PUBLICATIONS

Society Of Plactics Engineers (SPE), 29th Annual Tech. Conference, May 10-13, 1971 "New Concepts In Plastics Production Processing" R. Deaniu et al., pp. 541-544.

Primary Examiner—Donald E. Czaja
Assistant Examiner—W. Thompson
Attorney, Agent, or Firm—Michael J. Murphy

[57] ABSTRACT

A method of continuously forming articles having a predetermined, varying cross sectional geometry which comprises continuously introducing molten thermoplastic material from a die opening into a nip formed by opposing rotating rolls with at least one roll having a cooled, arcuate mold cavity in its surface contoured to correspond to each article cross sectional geometry thereby providing varying clearances in the nip, progressively successively arcuately forcing the mold cavity into shaping engagement with the molten thermoplastic material to mold the articles therefrom, maintaining the thermoplastic material containing the articles in contact with one of the rolls after exiting the nip thereby forming a first, curved intermediate shape wherein the thermoplastic material is partially set, immediately passing such shape over a cooled cylindrical surface to further yet not completely set the thermoplastic material and transpose the first shape into a second shape reversely configured from the first shape, discharging the second, shape from the cylindrical surface in a substantially planar direction to straighten such shape and transpose the articles into a substantially flat condition while continuing to set the thermoplastic material, and thereafter separating the articles from the remainder of the thermoplastic material.

21 Claims, 12 Drawing Figures

ROTARY FORMING OF ARTICLES

This is a continuation of application Ser. No. 067,463, filed Aug. 17, 1979, now abandoned.

BACKGROUND OF THE INVENTION

This invention is directed toward a process for continuously forming low profile articles from thermoplastic material.

Systems for fabricating thermoplastic articles such as injection molding, compression molding, sheet thermoforming, profile extrusion and the like are known. Injection and compression molding systems are intermittent with respect to uninterrupted molding of the finished articles in that each requires a substantial finite portion of the total molding cycle for mold opening, closing and plastic charging steps which adversely impact formed article cost. In addition, substantial stresses are usually built into the fabricated articles because of the inherent nature of such processes in that at economically attractive molding cycles the plastic adjacent the mold surfaces cools more than that toward the center. Such stresses, amongst other adverse effects, frequently result in distortion of the articles on release of the constraining influence of the mold and/or later exposure to heat such as sunlight, hot liquids, elevated temperature contents and the like. Sheet thermoforming wherein a soft preshaped web is forcibly drawn into a mold cavity likewise inherently develops substantial stress levels in the formed articles and further is limited in maximum article thickness to approximately that of the initial sheet or less depending on the extent of draw. Profile extrusion though continuous is limited to shapes of constant cross section in the direction of extrusion. Embossing generally affects only the surface characteristics of the material being embossed and involves forcefully impressing a design on a continuous web without the capability of controllably locally varying the profile.

SUMMARY OF THE INVENTION

Now, however, a new plastics fabricating process has been developed which substantially overcomes the foregoing prior art deficiencies.

Accordingly, it is a principal object of this invention to provide a process for continuously forming low profile articles of thermoplastic material having varying local cross sectional geometries or profile thicknesses and relatively low, uneven residual stress levels compared to prior art techniques to minimize warping.

An additional object is to provide a post-handling technique to cool articles formed by the aforementioned process in a flat manner at economically optimum rates.

Other objects of this invention will in part be obvious and will in part appear from the following description and claims.

These and other objects are accomplished by providing a method of continuously forming substantially flat articles having varying cross sectional profiles which comprises continuously introducing molten thermoplastic material from a die opening into a nip formed by opposing rotating rolls, at least one roll having a cooled arcuate molding cavity in its surface contoured to substantially correspond to the profile of the articles thereby providing varying clearances in the nip, progressively successively arcuately forcing the cooled mold cavity into shaping engagement with the molten thermoplastic material to mold the articles therefrom, maintaining the thermoplastic material containing the articles in contact with one of the rolls after exiting the nip thereby forming a first, curved intermediate shape wherein the thermoplastic material is partially set, passing such curved intermediate shape over a cooled cylindrical surface to further yet not completely set the thermoplastic material while relieving internal stresses and transposing the first shape into a second intermediate shape reversely configured from the first shape, discharging the second incompletely-set shape in a substantially planar direction to straighten the second shape and transpose the articles into a substantially flat condition while continuing to set the thermoplastic material, and separating the articles from the remainder of the thermoplastic material.

BRIEF DESCRIPTION OF THE DRAWINGS

In describing the overall invention, reference will be made to the accompanying drawings wherein:

FIG. 12 is a graphic illustration of the temperature profile of an article during various stages of the process embodying the apparatus of FIG. 1.

DETAILED DESCRIPTION OF THE ILLUSTRATED EMBODIMENTS

Figure 1:
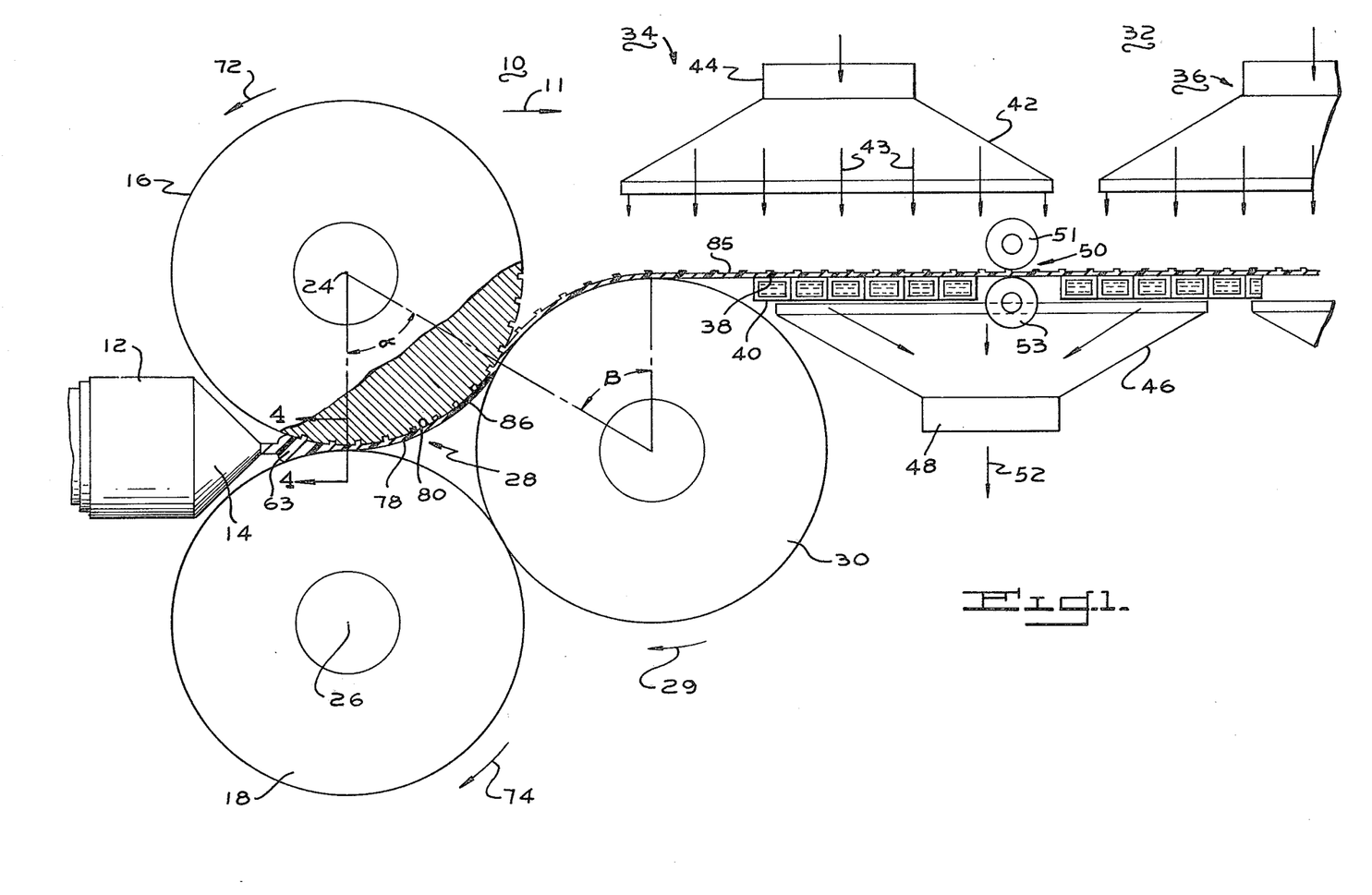
FIG. 1 is a vertical, schematic view of apparatus embodying the invention.
Figure 2:
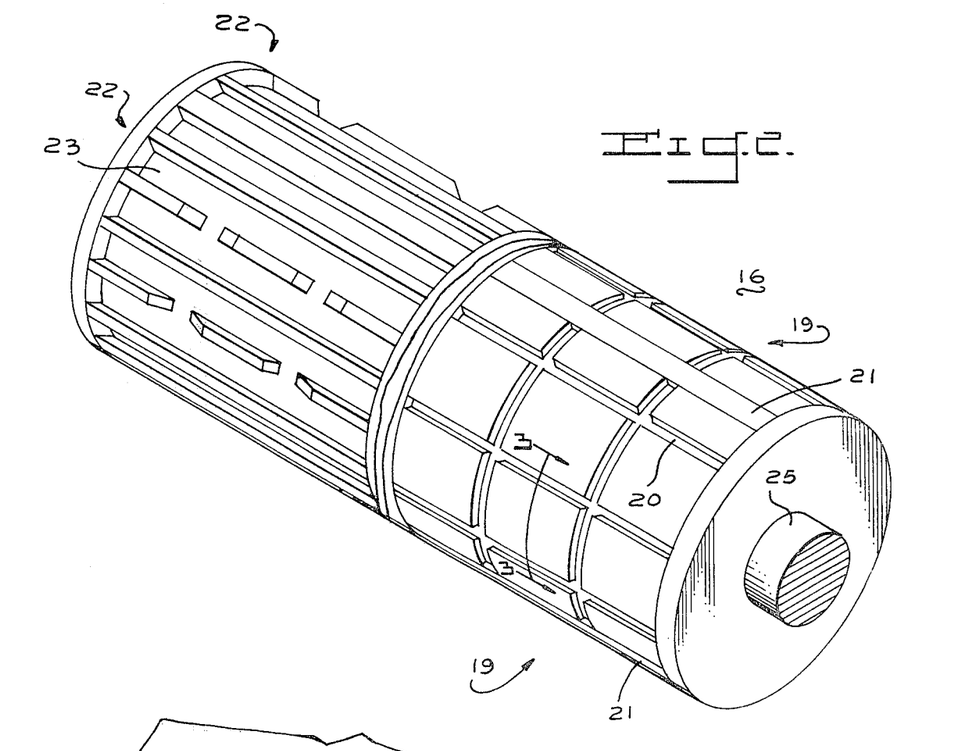
FIG. 2 is a three-dimensional view of a portion of the apparatus of FIG. 1.
Figure 3:
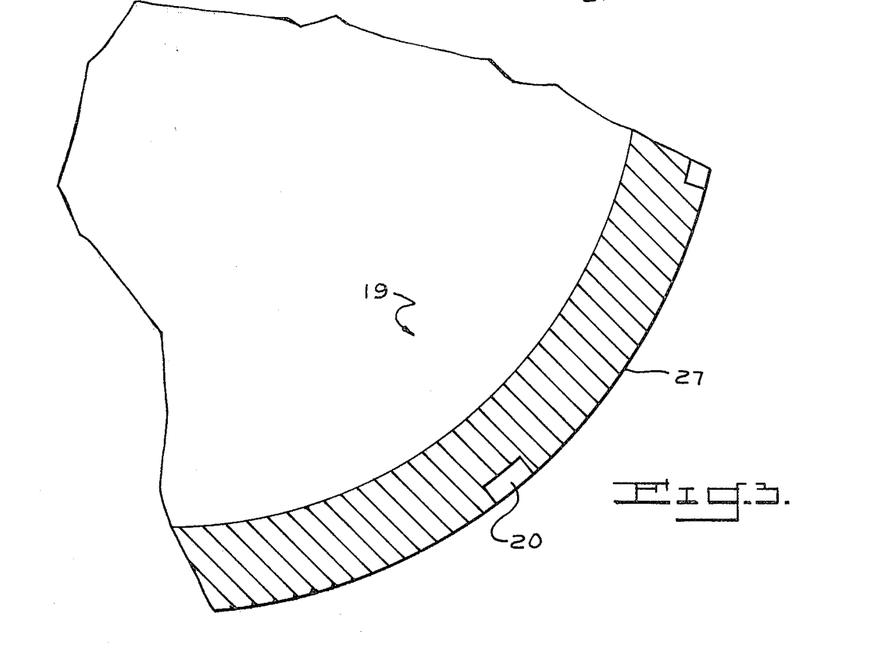
FIG. 3 is an expanded, sectional view along 3—3 of FIG. 2.

Referring now to FIG. 1, apparatus collectively identified as 10 is shown for continuously forming self-supporting, low profile articles having locally varying cross sectional thicknesses or profiles in the forward, forming or machine direction of arrow 11 and optionally at ninety degrees thereto. Apparatus 10 comprises manifold 12 in open communication with conventional upstream extrusion means, not shown, and with downstream shaping die 14 having an elongated horizontally disposed slot perpendicular to the plane of FIG. 1. Die 14 is in close proximity to the nip of a pair of opposing forming rolls comprising upper forming roll 16 and lower forming roll 18. In the embodiment of FIGS. 1-4, upper forming roll 16 (FIG. 2) has a cooled curved mold 19 contoured or with indentations comprising at least one shaping cavity 20 arcuately formed in its periphery. Mold cavity depth 20 should preferably not exceed about 0.50 inch (1.27 cms.) since at greater depths the ability to control cooling of a shape in the forming nip at economically attractive roll speeds and cooling media temperatures is greatly diminished. In the portion to the right of center in the FIG. 2 embodiment roll 16 has plural, peripherally disposed identical molds 19 arranged in a circular row, each mold comprising plural cavities 20 and being separated from the other molds at regular intervals by spacers 21. Such molds may be arranged in plural circular rows across the width of roll 16 as shown in FIG. 2 by the row containing molds 22 to the right of center of the roll illustrated. Molds in such rows may be the same or of different configuration, the latter arrangement depicted by the contour of cavities 23 in FIG. 2 in comparison with cavities 20. Molds 19, 22 may be an integral part of the forming roll or separately fabricated and rigidly secured by conventional means in recesses in the roll surface. In the embodiment of FIGS. 1–4, the peripheral surface of lower forming roll 18 is smooth in being devoid of forming cavities therein.

Rolls 16 and 18 are forcibly, adjustably urged together by conventional means, not shown, such as by fluid actuators operating against either end of drive shaft 25 and capable of exerting a force of from about 500 to about 5000 pounds (187 to 1870 kilograms). Such rolls are journaled for rotation and driven by conventional power means, not shown, about axes 24, 26 at typical speeds of from about one half to about ten revolutions per minute.

Figure 4:
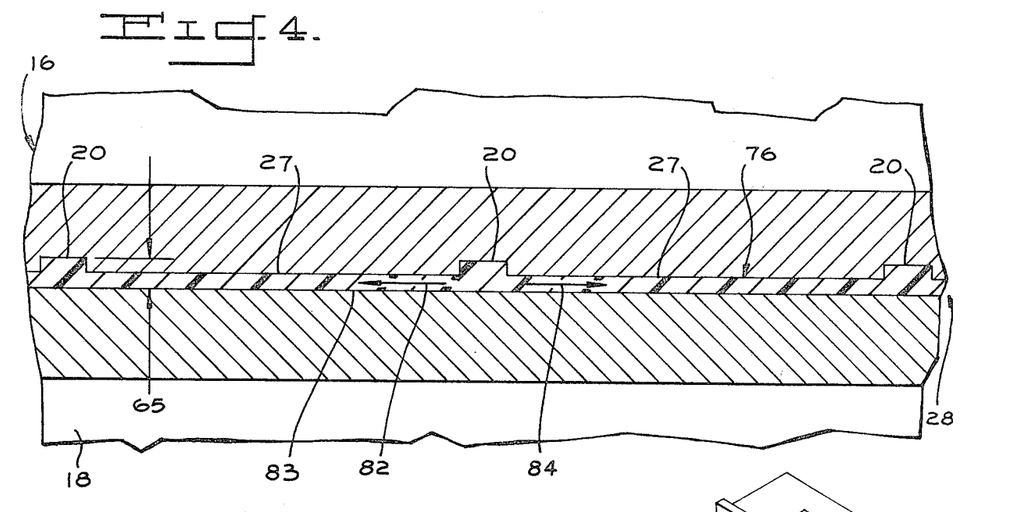
FIG. 4 is a partial, enlarged, vertical sectional view along 4—4 and perpendicular to the plane of FIG. 1.

Referring to FIG. 4, pressurized nip region 28 constitutes a non-uniform clearance between the opposing peripheral confronting surfaces of rolls 16, 18 where the latter are closest together. Cavity 20 and the circumscribing protrusions 26 of mold 19 provide varying depth in the range of about 0.015 to about 0.250 inch (0.38 to 0.635 cms.) to nip region 28 across the width of rolls 16, 18 parallel to axes 24, 26. Such clearance will vary with roll rotation from that shown depending on the particular mold configuration chosen. The clearance at the peripheral ends of rolls 16, 18, not shown in FIG. 4, is preferably set at a minimum via the peripheral surface configuration of the rolls in order to allow the plastic material to neck down in vertical thickness to facilitate later separation of the formed articles in such area from the rest of the thermoplastic material in a manner to be described.

Cooling roll 30 (FIG. 1) is preferably immediately adjacent forming rolls 16, 18 and, in the embodiment of FIGS. 1–4, has a smooth periphery and is driven in the direction of arrow 29 by conventional power means independent of or operably associated with the means for rotating rolls 16, 18. Roll 30 is preferably adjustably loaded against rolls 16, 18 by means similar to that urging rolls 16, 18 together, such loading facilitating climbing or descending movement of roll 30 along the periphery of roll 16 when an alternate position is desired from that of FIG. 1.

Molds 19 and the surfaces defining cavities 20 and protrusions 27 are cooled to the same or different temperatures by circulating an appropriate heat transfer medium such as water at a temperature of from about 35° to 160° F. (2° to 71° C.) through the interior of rolls 16, 18, 30 in conventional manner, such as by flow through an annular space between an inner cylindrical core (not shown) and the outer roll periphery. Baffling to promote turbulent movement to enhance heat transfer can be provided as desired. Conventional separate temperature control systems for each roll 16, 18 and 30 may be provided or a single system controlling all three rolls at a common surface temperature may be adequate when different temperatures are unnecessary.

Means 32 (FIG. 1) providing successive cooling stages for products formed in nip 28 are immediately downstream of roll 30 and comprise first cooling assembly 34 and adjacent similarly constructed assembly 36. Only assembly 34 will be described in detail. Assembly 34 comprises stationary support ramp 38 constituting the upper surface of each of a plurality of abutting, side-by-side cooling panels 40 through which a cooling medium is continuously circulated. Conventional tubing, valves, flow controllers, etc. not shown, may be provided to supply a cool heat exchange fluid such as water to panels 40, thereby maintaining the upwardly facing surface of ramp 38 at reduced temperature relative to the surroundings and thereafter discharging such fluid to an appropriate reservoir. Upper shroud 42 has inlet 44 in open upstream communication with a source of low pressure air, not shown. Heaters or equivalent, not shown, within shroud 42 increase the temperature of such air relative to that of the atmospheric surroundings whereupon it is discharged downwardly in the direction of arrows 43. Lower plenum 46 has outlet 48 open to the suction side of a conventional low pressure fan, not shown, to promote downward air flow in the direction of arrow 52, thereby generating a slight negative pressure to pull the plastic downward against ramp surface 38. Forwarding means comprises nip roll assembly 50 having upper 51 and lower 53 nip rolls set to nippingly engage products discharged from roll 30 and advance them to second cooling assembly 36.

Figure 7:
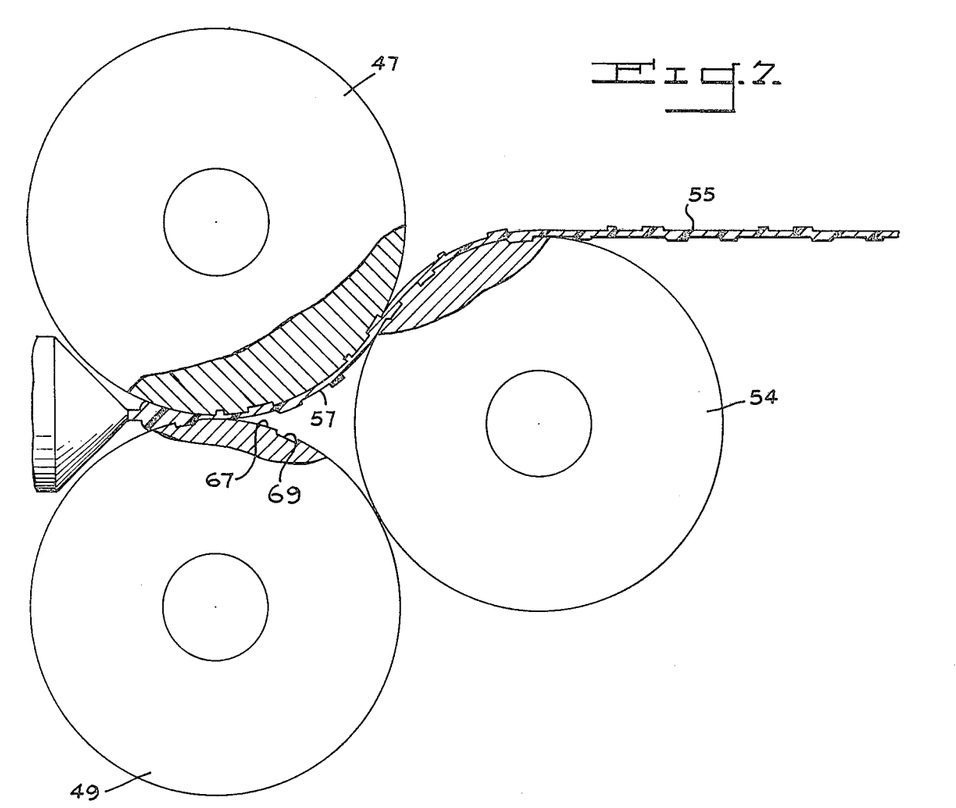
FIG. 7 is a view similar to FIG. 1, of an alternate embodiment of the invention.

The embodiment of FIG. 7 is similar to FIG. 1 except that instead of molds in only one forming roll, each roll 47, 49 has one or more molds with shaping cavities in their surfaces. Cooling roll 54 in FIG. 7 has the same surface pattern configuration as that of lower forming roll 49 and rolls 47, 49 and 54 are driven in exact synchronism for purposes to be later described by suitable conventional drive means and associated transmission systems, not shown.

Trimming apparatus 56 (FIG. 11) downstream of assembly 36 (FIG. 1) comprises die cutting roll 58 having peripherally spaced knives 60 protruding therefrom and adapted on rotation of roll 58 to gradually penetrate through the plastic around the periphery of each article held in the continuous length of thermoplastic thereby separating discrete articles from the remainder of the material. Each knife 60 bottoms on the surface of anvil roll 61 which is below and rotating in the reverse direction from die cutting roll 58. Apparatus 56 is exemplary and may vary greatly in detail from that shown.

Figure 6:
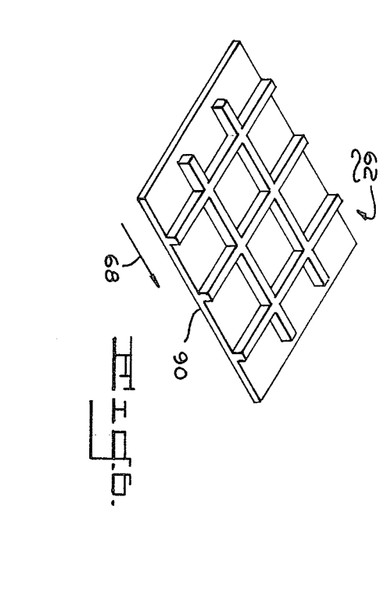
FIG. 6 is a three-dimensional view of an article obtained from the product of FIG. 5.

In operation, the apparatus of FIGS. 1 and 7 is capable of continuously forming self-supporting, low profile articles 62 (FIG. 6) having locally varying cross sectional thicknesses as exemplified at 64, 66 (FIG. 6) in both the lengthwise direction of forming depicted by arrow 68 in FIG. 6 as well as perpendicular thereto as illustrated by thicknesses 66, 70. Any moldable thermoplastic material such as medium impact polystyrene available from Monsanto Company as LUSTREX® 2400 is continuously introduced to nip 28 from the slot opening in die 14 to form a pool 63 (FIG. 1) of molten material which contains sufficient plastic to completely fill the mold cavities 20 (FIG. 4) then present in nip 28, since if insufficient material is present, voids or undesirable thin spots will appear in the finished article. In this regard the depth of pool 63 should exceed maximum clearance 65 in nip 28 (FIG. 4). With respect to the thermoplastic material, the term "molten" is used herein to describe material above its softening point having a viscosity low enough to flow readily under pressure. The temperature of the molten plastic in nip 28 and that of the cooled surfaces of mold 19 must be such that the plastic forming the outer surfaces of the mass on contacting the mold surfaces will partially set sufficiently to hold the mold shape yet the temperature of the overall mass is preferably such that the shape is flexible enough to facilitate bending removal of the article during extraction from the curved molds and to later flatten out in a manner to be described. Considered differently, the plastic and mold surface temperatures in region 28 cannot be so low as to prematurely chill the plastic at its surface when being squeezed about by rolls 16, 18 since if this occurs a grain structure develops extending parallel to the advancing movement of the article. In specific terms, the softening point of LUSTREX® 2400 is about 196° F. (91° C.) whereas the temperature of a molten pool 63 of such material is typically about 375° F. (177° C.) with reduced mold surface temperatures of about 65° F. (18° C.). Continuous reverse rotation of mold carrying rolls 16, 18 at the same peripheral speeds in the direction of arrows 72, 74 (FIG. 1) progressively, successively and continuously arcuately moves the curved shaping cavities 20 of molds 19 into continuously replenished pool 63 to forcibly rotationally squeeze the molten thermoplastic material and cause it to assume the shape of the nip. In so doing the material is induced to flow into immediate contact with the cooled surface 76 (FIG. 4) of the shaping mold thereby forming intermediate shape 78 (FIG. 1) having opposite surfaces, the upper one 80 having the article pattern conforming to the mold configuration molded therein and the lower one being smooth without surface protrusions. During shaping in nip 28 the molten material flows freely along the depressions in mold 19 in the general directions of arrows 82, 84 as well as lengthwise thereof in the forward direction of forming. Such liberal flow occurs with greatly reduced forces in comparison with those necessary to shape plastic at much lower temperatures and this is important in providing relatively stress-free articles according to the invention. Furthermore, as the low profile article is being formed in nip 28 (FIG. 4) the molten nature of the thermoplastic material and the reduced contact surface of the rolls in comparison with that occurring during injection molding results in relatively short plastic flow distances which mitigates against generation of substantial internal stresses in the plastic. The varying nip depth and consequent flow of material therein is responsible for providing the changes in thickness profile in the direction 68 of forming, i.e. thickness 66 versus solid rib formation 64 in FIG. 6, as well as perpendicular thereto, i.e. thickness 70 in comparison with 66. Spacer sections 21 (FIG. 2) in the embodiment of FIGS. 1-4 are not intended to shape material into part of the finished article but exist between immediately successive articles 62 to delimit same, and, when formed in relief, can be used as local reservoir areas to accommodate plastic pushed aside in the nip by outwardly projecting portions of the shaping mold. The remainder of the process before trimming essentially involves careful gradual cooling of intermediate shape 78 (FIG. 1) in order to promote disappearance of whatever minor stresses were developed during forming in the nip and removal of the articles from the mold in order to achieve the desired flatness in finished article 62 (FIG. 6).

Toward this end, in the embodiment of FIGS. 1-4 and as illustrated in FIG. 1, after leaving nip 28 which generally lies in a plane through axes 24, 26, upper surface 80 of intermediate shape 78 containing the article pattern is purposely allowed to remain locked in heat exchange contact with the cooled surfaces of cavities 20 and projections 27 of mold 19 for a finite predetermined rotational interval of roll 16 of about forty-five degrees (wrap angle α in FIG. 1) in order to further partially set the thermoplastic material to a self-supporting condition. This operating interval which can vary widely depending on the thickness and shape of the article being formed, the temperature and nature of the thermoplastic material and the rotary speed and surface temperature of the forming rolls is preferably from about 30° to about 60° or about 90°. During such contact period the pliant thermoplastic material comprising intermediate shape 78 is bent into an inwardly concave configuration. Also, during such operating interval α, a separate heating or cooling means, not shown, may optionally be used to positively directly influence the temperature of lower surface 86 of shape 78 which, as illustrated, is not at that time in conductive contact with the roll or mold surfaces. Thereafter shape 78 is uniformly pulled from roll 16 and preferably directly routed into heat exchange surface contact with the periphery of cooling roll 30 which is turning at the same velocity as that at which shape 78 is advancing linearly. At the time of removal of the articles from the molds the elevated temperature of the thermoplastic within the cross sectional thickness of each article relative to the lower temperature of the partially set, mold-contacting outer surface facilitates resilient bending extraction from the curved molds without generating great stresses in the outer molded article surfaces or breaking the part. After removal such increased temperature rearward of the molded surface then serves to anneal and substantially relieve whatever stresses were developed at the cool article surface during mold removal. Transfer of shape 78 to roll 30 brings lower smooth surface 86 into contact with the periphery of roll 30 for a finite rotational interval to further yet still not completely set the thermoplastic material of shape 78 containing articles 62 separably coupled therein. The variables affecting the optimum contact time of the shape 78 with cooling roll 30 are generally the same as those applicable to forming roll 16. In the embodiment of FIGS. 1-4, lower surface 86 contacts roll 30 through a wrap angle β which is about the same as that during which upper side 80 contacts roll 16 such that the dwell time of shape 78 in contact with roll 16 beyond nip 28 is about the same as with roll 30. Cooling roll wrap or contact angle β is preferably from about 30° to about 60°. As apparent from FIG. 1, intermediate shape 78 is bent into a reverse outwardly convex configuration as a result of contact with the curved surface of roll 30.

Under the pulling influence of rolls 51, 53 of nip roll assembly 50, outwardly convex, intermediate shape 78 comprising incompletely set thermoplastic material is then reshaped by discharging it in a planar horizontal direction from cooling roll 30 toward immediately adjacent cooling means 32 for further gradual cooling and setting of the thermoplastic material to a rigid condition. Intermediate shape 78 cannot be cooled too much on rolls 16, 18 and 30 since enough heat energy must be retained therein on leaving roll 30 to allow the thermoplastic to yield through a minor quantity of flow in being transposed from the outwardly convex curved shape assumed through contact with roll 30 to the desired flat, finished shape of FIG. 6. For medium impact polystyrene the minimum average temperature of the polymeric material at 85 in FIG. 1 is about 60° to about 180° F. (16° to 82° C.). In the embodiment of FIGS. 1-4, cooling in a uniform, controlled manner in successive stages in means 32 is important to allow dissimilar, low level stresses in the thermoplastic material to relieve to enhance dimensional stability and flatness in the finished articles. Since upper surface 80 of shape 78 containing the article configurations was in cooling contact through angle α with the surface of upper forming roll 16 while the plastic was at its highest temperature (vis-a-vis the lower temperature of 86 in later contact with roll 30) and the temperature difference between polymer and cooling surface was the greatest, it is important to remove heat energy from surface 86 at a greater rate than from surface 80. This dictates the need for differential cooling in assemblies 34 and 36 since if this is not done, curling in the forward machine direction can be expected. Gradual as opposed to accelerated cooling permits time for stresses in the thermoplastic material to relieve. More specifically, in contacting the surface of roll 30 through angle β, the upper portion of the article thickness including surface 80 is put under tension while the lower portion containing surface 86 is put under compression with such stresses being reversed when the shape is flattened on cooling roll 30. The stresses built up in the outer thickness layers of the plastic as a result of these shape transitions must be allowed to substantially relieve as the material is being set if flatness is ultimately to be obtained in the finished article.

Controlled differential cooling is achieved in FIG. 1 by exposing upper surface 80 of shape 78 with the article pattern therein to turbulent air at a controlled temperature less than the temperature of the thermoplastic material but generally greater than atmospheric surrounding temperature which is on the order of 70° F. (21° C.) while downside surface 86 conductively contacts cooled support ramp 38 at a temperature below that of such atmospheric surroundings to remove heat through surface 86 at a faster rate than through surface 80. In this respect, the upwardly facing surface of ramp 38 has been operated with medium impact polystyrene at temperatures on the order of about 40° to 120° F. (4° to 49° C.) via the flow of cooling water through panels 40 while air issuing from shroud 42 at a temperature of from about 72° to 140° F. (22° to 60° C.) has been used to cool the upper portion of shape 78. Use of conductive contact cooling of the lower face of the article, however, is not considered critical. Turbulent air flow cooling of such lower face should also be functional and is preferred with the FIG. 7 embodiment wherein the article has molded surfaces on both sides. Other temperatures appropriate for different polymer operating conditions, article shapes etc. to achieve flatness in the final article can be determined by appropriate experimentation. This gradual differential cooling of shape 78 as it advances forwardly may be changed in detail from that just disclosed and continued or not as necessary in downstream cooling assemblies, not shown, constructed similarly to means 32 but perhaps operated at slightly different temperature conditions such that on exiting the last of such assemblies the thermoplastic material is substantially set in a useful, stable, rigid, substantially flat condition.

FIG. 12 depicts a typical cooling curve predicted in forming a flat 0.050 inch (50 mils) thick article of medium impact polystyrene in the system of FIGS. 1-4. As there apparent the upper molded and lower unmolded surfaces of the shape plunge rapidly in temperature from that of the mass exiting the die when contact occurs in the nip with the cooled mold surfaces of the upper roll and the smooth periphery of the lower roll (phase I). Thereafter, the lower surface temperature rises relative to that of the upper surface while the latter is kept in contact with the upper roll during the initial wrap (phase II) whereupon the sequence is reversed during wrap around the downstream cooling roll when the lower surface temperature plunges while the molded surface temperature which is not in contact with the third roll increases (phase III). Thereafter such surfaces are gradually reduced via differential cooling during phase IV to bring the plastic to a fully set condition.

Figure 11:
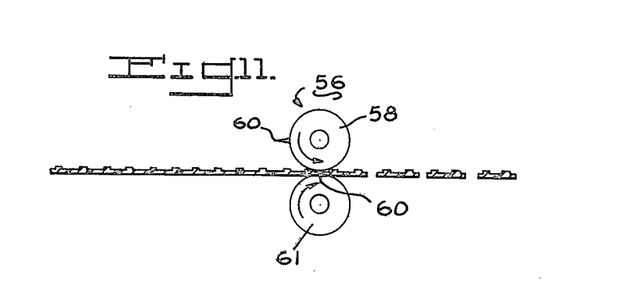
FIG. 11 is a schematic, elevational view of a trimming apparatus usable with the apparatus of FIGS. 1 and 7.

The thermoplastic material with the succession of articles 62 separably coupled therein is thereafter directed through trimming apparatus 56 wherein knives 60 successively cut through the thermoplastic material of shape 78 around the peripheries of the articles to separate finished articles 62 from the remainder of the thermoplastic material which is preferably recycled for reuse. Such repeated trimming of individual discrete articles from the continuous formation issuing from the last cooling stage may not be necessary when such formation constitutes the finished product per se. In this latter case it may only be necessary to remove waste material from the sides of the continuous length to place it in final form.

Figure 8:
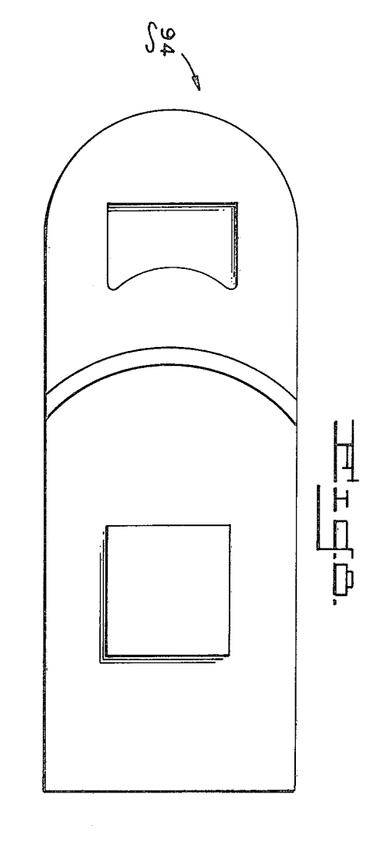
FIGS. 8 and 9 are plan and elevational views respectively in enlarged form of an article formable by the apparatus of FIG. 7.
Figure 9:
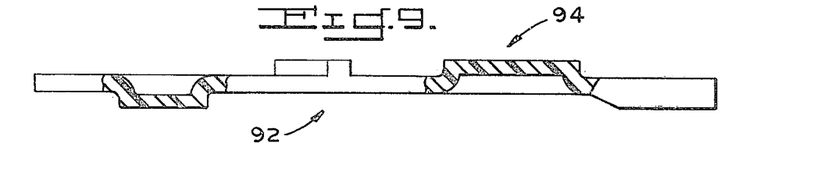

In the embodiment of FIG. 7, instead of a substantially smooth, unmolded surface 90 (FIG. 6) on the finished article, plural molds with shaping cavities 69 and projections 67 are provided in lower forming roll 49 to impart shaped pattern 92 (FIG. 9) on the lower surface of intermediate shape 55 while a different impression on the surface of upper forming roll 47 provides configuration 94 in FIG. 8 on the upper surface of 55. Since it is necessary to accommodate the pattern in the just-shaped pliable thermoplastic material during initial cooling of 55 to a self-supporting condition, one of the mold patterns of rolls 47 or 49 must be reproduced in downstream cooling roll 54. In the embodiment of FIG. 7, since shape 55 is being directed upwardly into contact with roll 54 downside surface 57 will contact the periphery of roll 54 and therefore the latter has the same mold pattern as in roll 49 and is turning in synchronous rotation with rolls 47, 49. Shape 55 optionally could be directed downwardly into contact with roll 54 in which case roll 54 would have the pattern of upper forming roll 50 duplicated thereon instead of the pattern of lower roll 49. The remainder of the system downstream of roll 54 in the embodiment of FIG. 7 is intended to be similar to that of FIG. 1 although it may be necessary to adjust temperatures of the cooling media in the cooling stages differently from those used in forming an article with a pattern on only one side in order to obtain the desired flatness.

Figure 10:
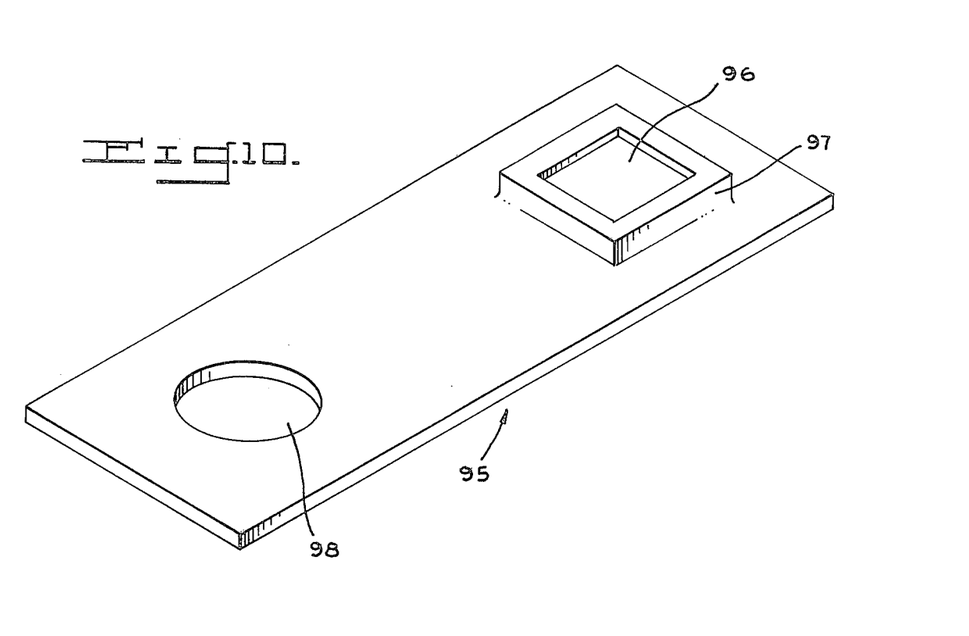
FIG. 10 is a three-dimensional view of an alternate form of article formable by apparatus of the type shown in FIG. 7.

FIG. 10 illustrates yet a further article configuration which can be formed according to the process of the present invention wherein is shown planar, self-supporting article 95 having blind hole 96 with a surrounding collar 97 in combination with spaced through hole 98.

The systems just described embodying the invention are facilely capable of providing low stress articles of thinner wall sections at lower forming pressures and significantly higher production rates and lower capital investment per produced article than those of alternate prior art molding processes.

Figure 5:
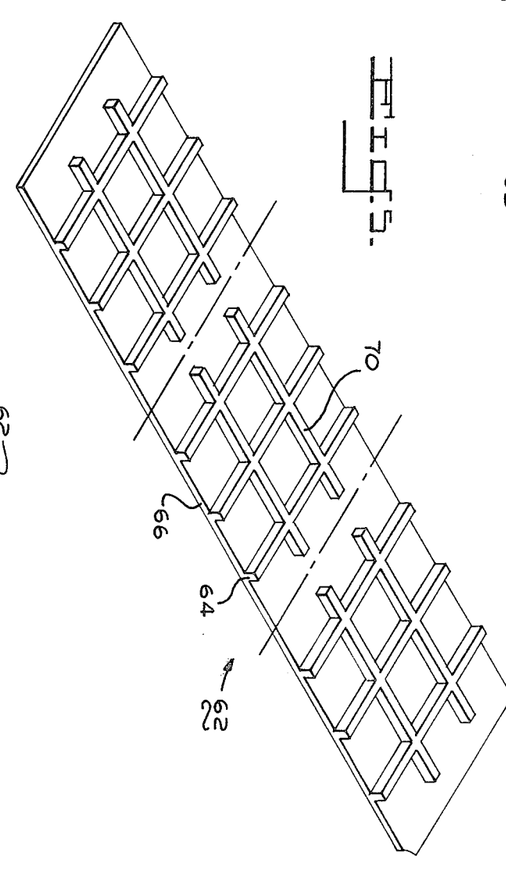
FIG. 5 is a three-dimensional view of the unsectioned product formed with the apparatus of FIG. 1.

Articles formable by the process of the invention can vary widely in size and shape. Such articles can comprise either individual discrete parts of a particular design which are trimmed from a continuous length of thermoplastic as described, or, alternatively, a succession of molded shapes which together form a continuous body of plastic which is not sectioned crosswise to its length after forming. Typical of the latter would be lattice and net-like structures and the like. Articles formable by the process of the invention can be in finished form on issuing from the system or can constitute parts which are further processed in other downstream forming or joining systems into a finished product. Representative articles comprise battery separators, light diffusers, separation or permeation membranes and like configurations where adjacent thick and thin sections and relatively large surface area to thickness ratios are required. Generally speaking, for low silhouette articles formable by the process of the invention, the ratio of (a) the extent of vertical protrusion of an enlargement (e.g. 64 in FIG. 5) away from the surface of the constant thickness planar substrate portion from which it extends (e.g. 66 in FIG. 5) to (b) the thickness of such substrate portion (66 in FIG. 5) should be from about 0.004 to about 5 and preferably from about 0.3 to about 5. Acceptable flatness or freedom from warpage in articles formable by the invention will vary and depend on the nature of the article being shaped. When forming a generally planar article such as 62 in FIG. 6 such article is considered flat on issuing from the forming system when a strip six inches (15.2 cms.) long by nine inches (22.9 cms.) wide varies from horizontal planarity by no more than about 10 to about 60 mils (0.025 to 0.152 cms.).

The preceding description and particularly the drawings are set forth for purposes of illustration only and are to be taken in a limited sense. Various modifications and alterations will be readily suggested to persons skilled in the art. For example, the third cooling roll could be constructed such that a mild negative pressure can be drawn on its periphery during contact with the formed shape to improve contact of the plastic therewith and therefore its cooling rate. Likewise feasible is a reorientation of the system components such that instead of introducing the melt to the nip in a horizontal direction, it is instead introduced either vertically upwardly or downwardly with the molded shape then advanced into contact with the periphery of the adjacent cooling roll oriented perpendicular to the horizontal. It is intended, therefore, that the foregoing be considered as exemplary only and that the scope of the invention be ascertained from the following claims.

What is claimed is:

1. In the method of continuously forming substantially flat articles having varying cross sectional profiles by steps which include:
    (a) continuously introducing molten thermoplastic material from a die opening into a nip formed by opposing rotating rolls, at least one roll having a cooled arcuate mold cavity in its surface contoured to substantially correspond to the profile of the articles thereby providing varying clearances in the nip;
    (b) progressively successively arcuately forcing the cooled cavity into shaping engagement with the molten thermoplastic material to mold the articles therefrom;
    (c) maintaining the thermoplastic material containing the articles in contact with one of the rolls after exiting the nip thereby forming a first, curved intermediate shape with portions having said varying cross sectional profiles therein, the temperature within the thickness of said portions being greater than that of said portions adjacent to the cooled cavity surface;
    (d) extracting said portions from the curved molds by sliding said portions along the mold walls while flexing the cooled outer surfaces inwardly as a result of the increased temperature within the thickness, as said at least one roll continues to rotate;
    (e) passing such shape over a cooled cylindrical surface to further yet not completely set the thermoplastic material while transposing said first shape into a second intermediate shape reversely configured from the first shape;
    (f) discharging the second, incompletely-set shape in a substantially planar direction to straighten the second shape and transpose the articles into a substantially flat condition; and thereafter
    (g) separating the articles from the remainder of the thermoplastic material;
    the improvements minimizing stress levels in the articles which comprise:
    conductively increasing the temperature of the outer surfaces of said varying cross sectional portions during steps (d), (e) and (f) as a result of the greater temperature within the thickness to anneal the outer surfaces of said varying cross sectional portions thereby substantially relieving stresses developed in the outer surface during mold removal; and then
    gradually uniformly further cooling the intermediate shape to fully set the thermoplastic material without generating substantial additional stresses therein.

2. The method of claim 1 wherein during step (e) the shape is passed over a cooling roll while in heat exchange surface contact therewith.

3. The method of claim 2 wherein sufficient heat energy is retained in the thermoplastic material on leaving said cooling roll to allow such thermoplastic material to vie through a minor quantity of flow.

4. The method of claim 3 wherein the advancing movement of the thermoplastic material containing the articles after exiting the nip is uniform.

5. The method of claim 4 wherein said articles comprise individual discrete parts successively separably coupled in the thermoplastic material.

6. The method of claim 5 wherein step (g) comprises repeatedly trimming such parts from the thermoplastic material after said cooling.

7. The method of claim 6 wherein the cross sectional profile of the articles varies both in the direction of forward movement of the thermoplastic material and at ninety degrees thereto.

8. The method of claim 7 wherein said at least one roll has plural mold cavities peripherally disposed therein and during step (b) the articles are delimited by spacer sections between the plural molds in said at least one roll.

9. The method of claim 8 wherein the thermoplastic material in forming the first curved intermediate shape in step (c) is in contact with one of the rolls through about thirty to about ninety degrees of roll movement.

10. The method of claim 9 wherein during step (e) the shape is in contact with the cylindrical surface through an interval which is substantially the same as that during which the thermoplastic material is in contact with one of the rolls in forming the first curved intermediate shape in step (c).

11. The method of claim 10 wherein during step (e) the shape is held in heat exchange contact with the cooling roll through a rotary interval of about thirty to about sixty degrees.

12. The method of claim 11 wherein the opposed rotating rolls and cooling roll are turning at the same velocity as that at which the thermoplastic material is advancing linearly.

13. The method of claim 12 wherein such gradual further cooling occurs by exposing at least one side of the intermediate shape to turbulent air.

14. The method of claim 13 wherein such gradual further cooling occurs by exposing both sides of the intermediate shape to turbulent air.

15. The method of claim 14 wherein the temperature of the air is less than the temperatures of the thermoplastic material but greater than a temperature on the order of 70° F.

16. The method of claim 15 wherein both of the opposing rotating rolls forming the nip have cooled, shaping cavities.

17. The method of claim 16 wherein during step (e) the shape is passed over a cooling roll having one of the mold patterns of the opposed rotating rolls therein, said shape being in heat exchange contact with the surface of such pattern.

18. The method of claim 17 wherein said cooling roll is turning in synchronous rotation with the opposed rotating rolls.

19. The method of claim 5 wherein each such part has a through hole formed therein.

20. The method of claim 5 wherein each such part has a blind hole with a surrounding collar.

21. The method of claims 2, 3, 4, 5, 6, 7, 8, 9, 10, 11 or 12 wherein the thermoplastic material is impact polystyrene.

* * * * *